Figure 1:
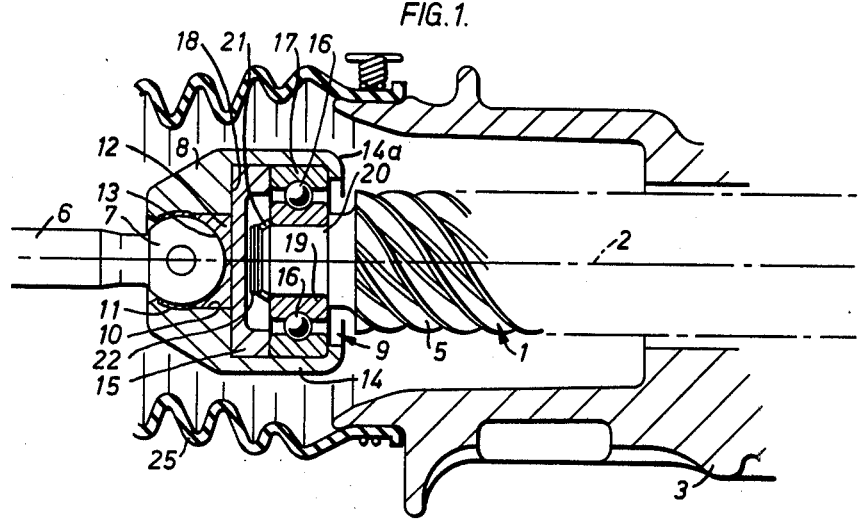

United States Patent [19]

Adams

[11] 4,282,770
[45] Aug. 11, 1981

[54] STEERING GEAR AND METHOD OF ASSEMBLING SUCH GEAR

[75] Inventor: Frederick J. Adams, Clevedon, England

[73] Assignee: Cam Gears Limited, Hertfordshire, England

[21] Appl. No.: 95,456

[22] Filed: Nov. 19, 1979

[30] Foreign Application Priority Data

Dec. 7, 1978 [GB] United Kingdom ............... 47569/78

[51] Int. Cl.³ .......................... B62D 1/20; F16H 27/02
[52] U.S. Cl. ................... 74/498; 29/148.4 C; 29/149.5 B; 74/89.18; 74/422
[58] Field of Search ................... 74/89.17, 89.18, 422, 74/498; 29/148.4 C, 149.5 B; 308/189 A

[56] References Cited

U.S. PATENT DOCUMENTS

| 2,027,560 | 1/1936 | Skillman | 29/149.5 B |
| 3,814,202 | 6/1974 | Rushton et al. | 74/498 |

FOREIGN PATENT DOCUMENTS

| 2223527 | 11/1972 | Fed. Rep. of Germany | 74/498 |
| 47710 | 10/1977 | Fed. Rep. of Germany | 308/189 A |
| 609356 | 9/1948 | United Kingdom | 74/498 |
| 148304 | 12/1962 | U.S.S.R. | 29/148.4 C |

*Primary Examiner*—Lawrence J. Staab
*Attorney, Agent, or Firm*—Yount & Tarolli

[57] ABSTRACT

A variable ratio steering apparatus includes a longitudinally extending rack gear which is movable along and rotatable about its longitudinal axis. One end of the rack is connected with an output member or tie rod by a connector assembly. The connector assembly includes a housing which encloses a universal joint. The universal joint is effective to allow the tie rod to pivot in a plurality of directions relative to the rack gear and housing. A bearing assembly is disposed within the housing adjacent to the universal joint and connects the rack gear with the housing to enable the rack gear to rotate relative to the housing without effecting actuation of the universal joint. The universal joint advantageously includes a ball and socket which is preloaded by deforming the housing to urge the bearing assembly toward the universal joint.

14 Claims, 2 Drawing Figures

STEERING GEAR AND METHOD OF ASSEMBLING SUCH GEAR

DESCRIPTION

This invention relates to a steering gear and to a method of assembling such a gear.

More particularly, the invention concerns a steering gear of the kind comprising a transmission member having a longitudinal axis along which it is displaceable in response to a steering input to provide a steering output, said transmission member being rotatable about its longitudinal axis and control means being provided for controlling said rotation during longitudinal displacement of the transmission member to vary the ratio of the gear, and in which the transmission member carries at at least one end thereof an output member which is connected to the transmission member by a universal joint so that the output member is longitudinally displaceable with the transmission member and is capable of gyrational movement with respect to that member. A steering gear of the kind specified is known in the art, for example in U.K. Patent Specification No. 609,356 and in our U.K. Patent Application No. 722/77 in which the transmission member is in the form of a rack bar or similar component which is longitudinally displaceable in response to rotation of a pinion having its teeth in mesh with a rack on the rack bar. During its longitudinal displacement the rack bar is subjected to controlled rotation (by co-operation between a non-rectilinear and longitudinally extending groove on the rack bar and a peg on the housing) and as a result of such rotation the ratio of the gear is caused to be varied. In such known constructions the output member is usually in the form of a tie rod which is coupled directly to the rack bar by a universal ball joint which latter permits relative rotation between the rack bar and the tie rod while the tie rod is available for connection as part of the steering linkage to steerable road wheels of a vehicle to which the gear may be fitted. By this latter arrangement the tie rod is capable of exhibiting gyrational movement to accommodate shock forces to which the steering system may be subjected and displacement with the rack bar to effect a steering manoeuvre. However during axial rotation of the transmission member to vary the gear ratio in such known arrangements, the relative axial rotation between the output member and the transmission member which results and which is effected at the universal joint has the disadvantage that it can cause the joint to be subjected to considerable wear with consequential reduction in its life expectancy. It is an object of the present invention to provide a steering gear of the kind specified and by which the aforementioned disadvantage can be alleviated.

According to the present invention there is provided a steering gear comprising a transmission member having a longitudinal axis along which it is displaceable in response to a steering input to provide a steering output, said transmission member being rotatable about its longitudinal axis; control means for controlling rotation of the transmission member about its said axis during longitudinal displacement of that member to vary the ratio of the gear; an output member carried by the transmission member at an end thereof; a universal joint by which said output member is connected to the transmission member so that the output member is longitudinally displaceable with the transmission member and is capable of gyrational movement with respect thereto, and wherein the universal joint is mounted in a bearing housing which housing is connected to the said end of the transmission member by a thrust bearing by which the bearing housing and the universal joint are longitudinally displaceable with the transmission member and the bearing housing is rotatable about the longitudinal axis with respect to the transmission member.

By the present invention rotation of the transmission member during its longitudinal displacement and relative to the output member can be accommodated by the thrust bearing so that the universal joint between the output member and the bearing housing is not necessarily subjected to additional wear as a result of the transmission member's rotation; however, the connection between the bearing housing through the thrust bearing with the transmission member ensures that the output member is displaceable longitudinally in unison with the transmission member to effect a steering manoeuvre.

The thrust bearing can be retained relative to the bearing housing by deformation of one or more parts of the housing radially (with respect to the longitudinal axis) over that bearing. In a preferred construction the bearing housing includes the skirt within which the thrust bearing is received and which skirt is deformed radially inwardly over the thrust bearing to restrain relative axial displacement between the bearing housing and the transmission member. The universal joint is preferably a ball joint which, desirably, is preloaded to a predetermined degree to ensure that the pivotal movement between the output member and the bearing housing has a required degree of tightness. By use of such a ball joint and the aforementioned deformation technique for connecting together the bearing housing and the thrust bearing, a particular advantage may be achieved in that during such deformation of the bearing housing on assembly of the gear the ball joint can be constructed to be preloaded automatically (and preferably to a predetermined degree). With this in mind the ball end of the ball joint may be seated in a plug which is axially displaceable relative to the bearing housing and said deformation of the bearing housing applies a thrust axially in a sense to displace the plug relative to the bearing housing and preload the ball end between the plug and a bearing surface of the housing. Preferably the displacement of the plug is effected by use of a thrust plate which is interposed between the plug and the thrust bearing and an abutment can be provided on the bearing housing against which the thrust plate can bottom when subjected to the aforementioned thrust (during deformation of the bearing housing) thereby to restrict the thrust to which the plug is subjected and thereby to determine the preloading of the ball joint.

In a simple construction the thrust bearing may be two plain interengaging plastics members or a plain bearing sleeve which is co-axial with the longitudinal axis of the transmission member and which is secured either to that member or to the bearing housing while the bearing housing or the transmission member respectively can rotate relative to the bearing sleeve. In a preferred construction however the thrust bearing comprises rolling elements which rotate between inner and outer races of which the inner race is carried by the transmission member and the outer race is carried by the bearing housing. Such rolling elements as aforesaid can, for example, be balls, rollers or needles of which the latter may serve to provide stability to the thrust bearing by alleviating bending in the longitudinal sense between the transmission member and the bearing housing.

Usually the transmission member will be a rack bar or similar component while the output member usually will be a tie rod.

Having in mind the aforementioned advantageous and desirable feature of automatically preloading the ball joint during deformation of the bearing housing to connect that housing to the thrust bearing, there is further provided in accordance with the present invention a method of assembling a steering gear of the kind specified which comprises mounting a ball end of the output member in a bearing housing to form the universal joint; mounting a thrust bearing on the transmission member; assembling the bearing housing over the thrust bearing, and deforming the bearing housing both to secure that housing to the thrust bearing and to preload the ball joint by axial thrust which is imparted to the ball joint during deformation of the bearing housing.

Figure 2:
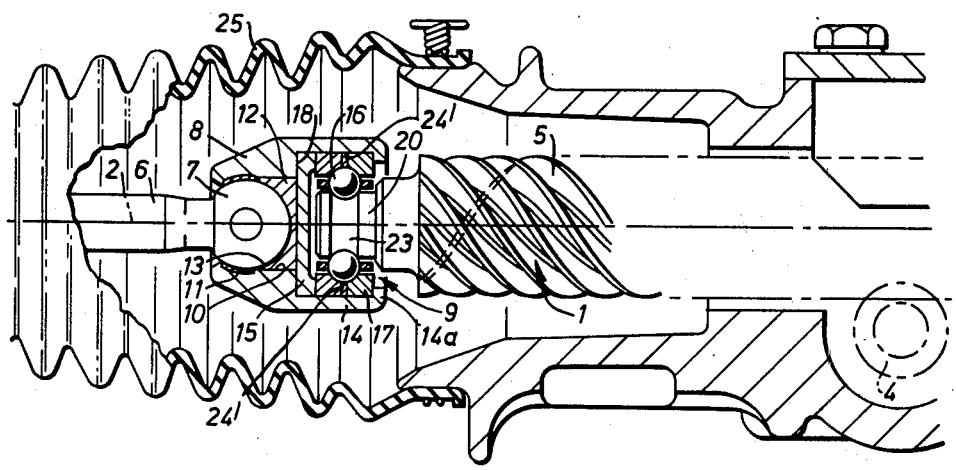

Embodiments of steering gears of the kind specified and constructed in accordance with the present invention will now be described, by way of example only, with reference to the accompanying illustrative drawings in which:

FIG. 1 is a section through part of a first embodiment of the gear and illustrates the form of thrust bearing between the bearing housing and the transmission member, and FIG. 2 is a similar section to that shown in FIG. 1 through part of a second embodiment of the gear having a modified form of thrust bearing.

The basic structure and operation of the steering gears in the embodiments of FIGS. 1 and 2 is the same and each gear is of the rack and pinion kind comprising a rack bar 1 having a longitudinal axis 2 along which it is displaceable in a gear housing 3. Rotatably mounted in the gear housing 3 is a pinion 4 (see FIG. 2) the teeth of which are in meshing engagement with a longitudinal array or rack of teeth 5 on the rack bar 1 so that upon rotation of the pinion 4 the rack bar 1 is driven longitudinally through the housing 3. The pinion 4 will usually be rotated in response to a steering input while the longitudinal displacement of the rack bar 5 is utilised to provide a steering output and in the context of the present invention the ratio of the steering gear is intended to be variable in accordance with the axial positioning and displacement of the rack bar 1 with respect to the housing 3. With this in mind the rack teeth 5 are of helical formation extending wholly or part way around the circumference of the rack bar 1 and control means (not shown) is provided by which predetermined and controlled rotation of the rack bar 1 with respect to the housing 3 and about its axis 2 is effected during longitudinal displacement of the rack bar. By such controlled rotation of the rack bar the ratio of the gear can be varied as required. The control means will usually be in the form of a cam track and follower coupling between the rack bar and the gear housing and examples of steering gears which incorporate a variable ratio facility as above described are disclosed in U.K. Pat. No. 609,356 and in our U.K. patent application No. 722/77.

For transmission of the steering output from the rack bar 1, each end of the rack bar emerges from the gear housing 3 and is coupled to a tie rod 6 which is intended for connection as part of the steering linkage to the steerable road wheels of a vehicle to which the gear is fitted. For convenience, FIGS. 1 and 2 each illustrate the connection between one end of the rack bar 1 and a tie rod 6 and only that end will be described hereinafter although it will be appreciated that the arrangement is duplicated at the other end of the rack bar 1.

The tie rod 6 has a ball end 7 which forms a universal joint in a bearing housing 8. The bearing housing 8 is mounted on the end of the rack bar 1 for axial displacement in unison therewith by a thrust bearing 9 by which the bearing housing is rotatable about the longitudinal axis 2 and with respect to the rack bar. In addition the ball joint formed by the ball end 7 of the tie rod permits the tie rod to rotate about the axis 2 and to pivot with respect to the housing 8 so that the tie rod is capable of girational movement about the axis 2 with respect to the housing 8 and rack bar 1. More particularly, the ball end 7 is located in a bore 10 in the housing to bear against a ring member 11 of low friction bearing material. The ring member 11 is conveniently retained in an annular recess in the bore 10 and provides a part spherical bearing surface which is substantially complementary to the surface of the ball end 7 which it contacts. The ball end 7 is retained in the bore 10 against the bearing ring 11 by a plug 12. The plug 12 is longitudinally displaceable in the bore 10 and has a part spherical recess 13 which is substantially complementary to, and within which is seated the ball end 7. In an unstressed condition the plug 12 protrudes slightly from the bore 10 and along the axis 2 into an enclosure formed by a cylindrical skirt 14 of the bearing housing 8. The thrust bearing 9 is located within the enclosure of the skirt 14 and interposed axially between the thrust bearing 9 and the plug 12 is a thrust plate 15 which is an axially sliding fit within the enclosure of the skirt 14. The bearing housing 8 is secured relative to the thrust bearing 9 by deforming the hem part 14a of the skirt 14 radially inwardly (with respect to the axis 2) over the thrust bearing 9 so that the bearing is captured between the radially deformed part of the skirt and the thrust plate 15 to be restrained against axial displacement with respect to the bearing housing 8. In the embodiments of FIGS. 1 and 2 the thrust bearing 9 is in the form of a ball race having balls 16 which run in radially inner and outer races of which the outer race is carried by an outer race member 17 and this member 17 is secured as a tight fit within the skirt 14 of the bearing housing by radial deformation of the hem part 14a to restrain relative axial rotation between the outer race member 17 and the bearing housing 8.

The radially inward deformation of the hem part 14a to retain the thrust bearing 9 in the bearing housing 8 is preferably achieved by a pending or rolling technique. A particularly advantageous feature which may be derived from the above described construction is that the ball joint formed by the ball end 7 in the bearing housing 8 can automatically be preloaded as the thrust bearing 9 is secured within the skirt 14 of the bearing housing. Upon deformation of the hem part 14a radially inwardly over the outer race member 17 it will be apparent that a thrust is directed on the member 17 to displace it relatively axially towards the thrust plate 15 and this thrust is transmitted through the plate 15 to react on the plug 12 in a sense to displace that plug (or to compress the plug) axially into the bore 10—thereby preloading the ball joint. Desirably the characteristics and dimensions of the plug 12 are arranged so that when the thrust plate 15 bottoms or abuts against an internal shoulder 18 of the skirt in response to the outer race member 17 being clamped within the skirt, a required preloading is effected through the plug 12 on the ball joint.

In the embodiment of FIG. 1 the inner race of the thrust bearing 9 is carried by an annular member 19 mounted on a shaft part 20 formed at the end of the rack bar 1. The inner race member 19 is secured against axial rotation on, and axial displacement with respect to, the shaft part 20, conveniently by being retained against a shoulder of the shaft part by a frusto conical collar 21 which is swaged onto a frusto conical rebate in the shaft part 20 to react axially between the inner race member 19 and a flange 22 at the end of the shaft part 20.

In the embodiment of FIG. 2 the inner race of the thrust bearing 9 is formed by an annular groove 23 which is machined in the shaft part 20 provided at the end of the rack bar 1. To facilitate assembly of the thrust bearing 9 the outer race member 17 is split circumferentially at 24 so that the two parts of that member are effectively clamped together between the thrust plate 15 and the radially inwardly deformed hem part 14a. Annular packing discs or other spacing means 24' can be provided between the axially opposed faces of the two parts of the outer race member 17 to alleviate jamming of the balls 16 between those two parts as they are clamped together during deformation of the hem part 14a.

In each of the aforementioned embodiments the procedure for assembling the connection between the tie rod 6 and rack bar 1 is substantially the same whereby the thrust bearing 9 is first mounted on the end of the rack bar 1 following which the bearing housing 8 (with the ring 11, ball end 7, plug 12 and thrust plate 15 already located therein as appropriate) is mounted with its skirt 14 enclosing the thrust bearing 9 following which the hem part 14a of the skirt is deformed radially inwardly to secure the assembly and preload the ball joint. From such an assembly it will be apparent that the tie rod 6 will pivot and rotate with respect to the bearing housing 8 and will be displaced longitudinally with that housing in conventional manner to accommodate shock loads which may be imparted thereto from the vehicle road wheels and to effect appropriate steering manoeuvres while rotation of the rack bar 1 (which is caused during a variation in the ratio of the steering gear) will be absorbed by the thrust bearing 9 so that the ball joint is not subjected to wear which can be attributed to rotation of the rack bar 1.

Similarly to conventional rack and pinion steering gears which incorporate tie rods, tubular bellows 25 are provided which are clamped at one end to the tie rod and the other end to the steering gear housing 3 so that the rack bar, the bearings, joints and part lengths of the tie rods are located in a substantially sealed enclosure.

I claim:

1. A steering gear comprising a transmission member having a longitudinal axis along which it is displaceable in response to a steering input to provide a steering output, said transmission member being rotatable about its longitudinal axis; control means for controlling rotation of the transmission member about its said axis during longitudinal displacement of that member to vary the ratio of the gear; an output member carried by the transmission member at an end thereof; a universal joint by which said output member is connected to the transmission member so that the output member is longitudinally displaceable with the transmission member and is capable of gyrational movement with respect thereto, and wherein the universal joint is mounted in a bearing housing which housing is connected to the said end of the transmission member by a thrust bearing by which the bearing housing and the universal joint are longitudinally displaceable with the transmission member and the bearing housing is rotatable about the longitudinal axis with respect to the transmission member, said thrust bearing being retained relative to the bearing housing by deformation of part of the bearing housing radially with respect to the longitudinal axis over the thrust bearing, said thrust bearing being located in a skirt of the housing and is retained by deformation of the skirt radially inwardly over the thrust bearing, said universal joint being a ball joint between a ball end of the output member and the bearing housing and deformation of the housing to retain the thrust bearing preloads the ball joint.

2. A steering gear as claimed in claim 1 in which the ball end is seated in a plug which is axially displaceable in the bearing housing and said deformation of the bearing housing to retain the thrust bearing applies a thrust axially in a sense to displace said plug and preload the ball end between the plug and a bearing surface carried by the bearing housing.

3. A steering gear as claimed in claim 2 in which the thrust bearing is retained in the bearing housing axially between the deformed part of said housing and a thrust plate which is displaceable axially with respect to the bearing housing and through which thrust plate a reaction is applied to the plug during deformation of the bearing housing to axially preload the ball joint.

4. A steering gear as claimed in claim 3 in which the thrust plate is capable of restricted axial displacement with respect to the bearing housing and in a sense to preload the ball joint so that upon the thrust plate attaining its permissible restricted displacement during deformation of the bearing housing a predetermined preload is applied to the ball joint.

5. A steering gear as claimed in claim 1 in which the thrust bearing has rolling bearing elements which are rotatable between inner and outer races, the inner race being secured relative to the transmission member and the outer race being secured relative to the bearing housing.

6. A steering gear as claimed in claim 5 in which the inner race is formed on a shaft part of the transmission member and an outer race member is provided which is split circumferentially relative to the shaft part to facilitate assembly of the thrust bearing on the shaft part.

7. A steering gear as claimed in claim 5 in which the inner race is formed on an inner race member which is mounted and retained on a shaft part of the transmission member.

8. A steering gear as claimed in claim 5 in which the outer race is carried by an outer race member which is retained relative to the bearing housing by deformation of part of the bearing housing radially with respect to the longitudinal axis over the outer race member.

9. A steering gear as claimed in claim 1 in which the transmission member is a rack member which is longitudinally displaceable in response to rotation of a pinion which is in engagement with rack teeth on said rack member.

10. A steering gear as claimed in claim 9 in which the output member is a tie rod.

11. A method of assembling a steering gear having a transmission member with a longitudinal axis along which it is displaceable in response to a steering input to provide a steering output, said transmission member being rotatable about its longitudinal axis; control means for controlling rotation of the transmission member about its said axis during longitudinal displacement of that member to vary the ratio of the gear; an output member carried by the transmission member at an end thereof; a universal joint by which said output member is connected to the transmission member so that the output member is longitudinally displaceable with the transmission member and is capable of gyrational movement with respect thereto, and which method comprises mounting a ball end of the output member in a bearing housing to form the universal joint; mounting a thrust bearing on the transmission member; assembling the bearing housing over the thrust bearing, and deforming the bearing housing both to secure that housing to the thrust bearing and to preload the ball joint by axial thrust which is imparted to the ball joint during deformation of the bearing housing.

12. A variable ratio steering apparatus for use in effecting turning movement of a steerable vehicle wheel, said apparatus comprising a longitudinally extending rack gear movable along its longitudinal axis, control means for effecting rotational movement of said rack gear about its longitudinal axis simultaneously with movement of said rack gear along its longitudinal axis to vary the rate of movement of said rack gear along its longitudinal axis and the rate of turning movement of the steerable vehicle wheel, a pivotal output member connected with the steerable vehicle wheel, a housing, universal joint means disposed within said housing for enabling said output member to pivot in a plurality of directions relative to said rack gear, and bearing means disposed within said housing adjacent to said universal joint means for connecting said rack gear with said housing and for enabling said rack gear to rotate relative to said housing and said universal joint means about the longitudinal central axis of said rack gear, said bearing means being disposed between said housing and said one end portion of said rack gear to transmit thrust forces from said rack gear to said housing while enabling said rack gear to rotate relative to said housing.

13. An apparatus as set forth in claim 12 wherein said universal joint means includes a first component which is connected to said output member for movement therewith and a second component connected to said housing for movement therewith, said bearing means being effective to enable said rack gear to rotate about its central axis relative to said housing to prevent rotation of said housing and said second component of said universal joint relative to said first component of said universal joint upon rotation of said rack gear.

14. An apparatus as set forth in claim 12 wherein said universal joint means includes a ball connected with one end portion of said output member and a socket disposed within said housing and enclosing said ball, said housing including means for urging said bearing means toward said universal joint means to provide a preload force against said ball and socket.

* * * * *